J. M. DELSON.
PERPETUAL INVENTORY.
APPLICATION FILED JUNE 21, 1917.

1,280,182.

Patented Oct. 1, 1918.
2 SHEETS—SHEET 1.

Received May 22, 1917.  24 Cans of Corn #1
Amount of Goods Now on Hand     John Doe.

Witnesses
C. A. Paterson
Charles Hill, Jr.

Inventor
John M. Delson.
by Charles W. Hill
Atty.

J. M. DELSON.
PERPETUAL INVENTORY.
APPLICATION FILED JUNE 21, 1917.

1,280,182.

Patented Oct. 1, 1918.
2 SHEETS—SHEET 2.

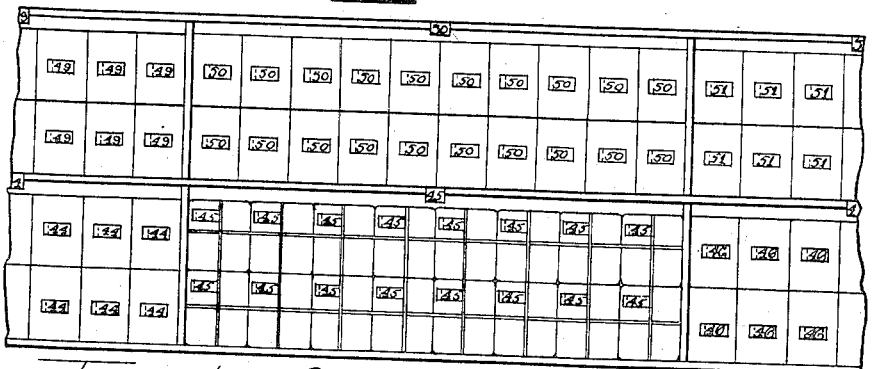

| TABLE OF MERCHANDISE SYMBLS | | | |
|---|---|---|---|
| COMMODITY | NO. | COMMODITY | NO. |
| TAPIOCO | 42 | WASHING SODA | 60 |
| COFFEE | 43 | CORN FLAKES | 61 |
| TEA | 44 | QUAKER OATS | 62 |
| SUGAR | 45 | FARINA | 63 |
| MILK | 46 | RICE | 64 |
| TOMATOES | 47 | WHEATENA | 65 |
| SARDINES | 48 | PUFFED RICE | 66 |
| PINEAPPLE | 49 | CORN MEAL | 67 |
| CORN | 50 | IVORY SOAP | 68 |
| PEAS | 51 | LAVA SOAP | 69 |
| OLIVES | 52 | MILADY SOAP | 70 |
| PICKLES | 53 | SHAVING SOAP | 71 |
| SALMON | 54 | NAPTHA SOAP | 72 |
| PEPPER | 55 | SOAP Chips | 73 |
| SALT | 56 | PUMKIN | 74 |
| NUTMEG | 57 | SQUASH | 75 |
| COCOA | 58 | PEARS | 76 |
| CLOVES | 59 | PLUMS | 77 |

Fig. 4

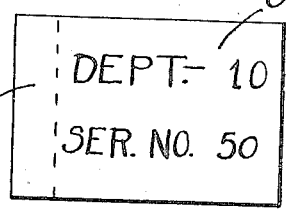

Fig. 5

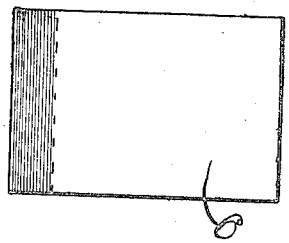

Witnesses
C. F. Peterson.

Inventor
John M. Delson.

UNITED STATES PATENT OFFICE.

JOHN M. DELSON, OF CHICAGO, ILLINOIS.

PERPETUAL INVENTORY.

1,280,182.

Specification of Letters Patent.

Patented Oct. 1, 1918.

Application filed June 21, 1917. Serial No. 176,008.

*To all whom it may concern:*

Be it known that I, JOHN M. DELSON, a citizen of the United States, and a resident of the city of Chicago, in the county of Cook and State of Illinois, have invented certain new and useful Improvements in Perpetual Inventories; and I do hereby declare that the following is a full, clear, and exact description of the same, reference being had to the accompanying drawings, and to the numerals of reference marked thereon, which form a part of this specification.

This invention relates to improvements in perpetual inventories for individual stores and chains of stores.

It is the custom where a chain of stores is operated, to supply them from one supply or main house conveniently located. Heretofore the system for keeping the inventory of the various stocks on hand at each store has been complicated, uncertain and not satisfactory, and further, in ascertaining what stock is on hand in any store it is necessary to do considerable figuring with the likelihood that the stock of goods arrived at would be inaccurate.

It is an object of this invention to provide a combination of co-acting inventory cards and tickets whereby the main house has a perpetual inventory of the stock of each goods kept at each branch store.

It is furthermore an object of this invention to provide a system in which it is able to quickly ascertain which kind of goods move slowly in the different stores, thereby being able to better regulate the distribution of the various kinds of goods as the particular location demands.

It is further an object of this invention to provide a system in which there is an absolute check against cash received so that the main store can balance stock sales and cash received quickly and easily.

It is furthermore an object of this invention to provide a system by means of which the supply of fresh goods demanded each day by the various stores is ascertained at a glance thereby insuring that the branch stores are always supplied without the branch stores making up an order; in other words, the stock on hand at the branch stores is known without the branch stores making a special order each day.

The invention consists in the matters hereinafter described and more fully pointed out on the drawings and defined in the specification and appended claims.

On the drawings:

Figure 1 denotes a sheet of inventory tickets and receipt.

Fig. 2 shows where a part of the tickets have been received by a branch store and a receipt given.

Fig. 3 illustrates a shelf full of goods with the inventory tickets thereon.

Fig. 4 indicates one of the inventory tickets detached from the sheet.

Fig. 5 shows the reverse side thereof.

Fig. 6 illustrates an index card.

As shown on the drawings:

Each store in the chain is given a specific number, as shown in the drawings denoted by Dept. 10, and each store has an index card 1, with a list of the goods carried for sale thereon, which are also given a serial number 2, as shown in Fig. 6. Sheets of inventory tickets 3, are provided for each store, which have the number of the store or department marked thereon and represented by the reference numeral 4, as shown in Fig. 2, and there are as many inventory sheets as there are kinds and brands of goods carried, so that each goods and brand will be given a serial number, as denoted by the reference numeral 5, in Fig. 2.

Said inventory sheets 3, comprise a plurality of individual inventory tickets 6, and the sheet is perforated transversely and longitudinally so that any number may be detached, and is also provided at the bottom with a blank 7, for the receipt of the manager of the branch store. Each of said individual tickets 6, as shown, has a perforated strip 8, integral therewith, which on the reverse side is glued or provided with adhesive matter, as shown clearly in Fig. 5.

The operation is as follows:

The index card gives the serial numbers of all the goods carried. Taking corn for illustration, its serial number as denoted by the index card, is 50. Inventory sheets consisting of tickets and receipt are provided for each article, and they in turn are lettered with the proper branch store number and also the serial number of the goods.

Now for instance, with corn, its serial number is 50, as denoted on the index card. When the corn is delivered to the branch store, say one case or twenty-four cans, a corresponding number of tickets 6, namely, twenty-four in number, are also given to the branch manager and he signs a receipt for them, all of which is shown in Fig. 2, and the balance of the sheet returned to the main store. The branch manager takes an inventory ticket for each can and pastes one on each can by means of the glued stub 8, as shown in Fig. 3. As each can, wrapped package, or box of goods is sold, the inventory ticket is detached by means of the perforations and the ticket placed in a suitable receptacle or bag and at the end of the day are returned to the main store.

The main store has a separate ledger for each branch store which has a separate page for every article and is numbered accordingly, for instance corn numbered 50 on the index card would have page 50 in the ledger. The ledger is ruled suitably having columns for dates, daily sales, balance column, in fact, any desired arrangement. Each account has at the top in a suitable place the minimum stock that is to be carried by the store, for instance, twenty-five cans of corn. Say on May 1st, the branch store was given fifty cans and sold ten cans the same day, for which ten inventory tickets would be placed in the bag. At night, these tickets would go to the main store and there entered on the ledger. The ledger man then subtracts the ten from the fifty, leaving forty cans on hand in the branch store. On May 2nd, twenty cans of corn are sold when the inventory tickets are received and entered on the ledger; this shows a balance of twenty cans. Inasmuch as the minimum stock is twenty-five cans, the manager of the main store is thereby advised that the branch No. 10, needs a case or so of corn. This is the same with each article.

In order to give a double check the receipt 7 has also printed thereon "Number of goods now on hand" for the branch manager to fill in so that the same can be checked up with the ledger to see if they tally.

It will be seen that an accurate perpetual inventory is kept and that the stock of the branch stores are kept up absolutely independently of the orders from said branches. This insures adequate stock at all times and eliminates the danger of running out of certain goods which usually happens quite often when the memory is relied upon or where a special man is employed to take inventory every week. Furthermore, the cash received from the branch stores and credits must agree with the total of the inventory checks so that an accurate check on the cash is had. Furthermore, it can be seen at a glance in the ledger what goods in different branches are slow movers and such goods can be shifted to other localities where there is a greater demand therefor.

In general, these inventory cards provide a system that is highly efficient by providing a perpetual inventory record and an automatic supply record when minimum amounts of each goods to be carried by the branches are set. In Fig. 3, owing to the small size of the illustration, a part of the printing on the inventory tickets has been omitted.

I am aware that numerous changes may be made in the inventory checks, and many other changes may be made without departing from the principles of this invention, and I therefore do not desire to limit the patent granted otherwise than necessitated by the prior art.

I claim as my invention:

1. Means for maintaining a continuous record of the amount of stock on hand consisting of a differently designated ticket for each class of goods, and a plurality of tickets for each class, a stub portion on each of said tickets provided with means to permanently attach the same to the article of stock designated by the ticket, said ticket when detached from the stub being adapted to represent by its detached condition that the article of stock which it was used to designate has passed out of stock.

2. Means for maintaining a continuous record of the amount of stock on hand consisting of a differently designated ticket for each class of goods, and a plurality of tickets for each class, the similar tickets for each class being arranged in sheets having perforations so that the inventory tickets are detachable from each other and each of said tickets being provided with a stub portion separable from the ticket, the said stub portion being provided with means to permanently attach the same to the article of stock designated by the ticket, said ticket when detached from the stub being indicative by its detached condition, that the article of stock which it was used to designate has passed out of stock.

3. Means for maintaining a continuous record of the amount of stock on hand at a number of distributing stations consisting of a differently designated ticket for each class of goods, a plurality of tickets for each class of goods, and differently designated tickets for each distributing station, a stub portion on each of said tickets provided with means to permanently attach the same to the article of stock to be designated by the ticket, said ticket when detached from the stub being indicative by its detached condition that the article of stock it was used to designate has passed out of stock.

4. Means for maintaining a continuous record of the amount of stock on hand at a distributing station which consists of a separate record for each class of stock supplied to the distributing station, a differently designated ticket for each class of goods, and a plurality of tickets for each class, a number of said designating tickets equal to the number of articles of stock supplied to the distributing station being transferable to the distributing station simultaneously with the stock designated by the said ticket, a stub portion on each of said tickets provided with means to permanently attach the same to the article of stock designated by the ticket, said ticket when detached from the stub being adapted to represent by its detached condition that the article of stock which it was used to designate has passed out of stock said detached ticket being adapted to be returned to the supply station by the distributing station to indicate to the supply station the amount of stock to be deducted from their record.

5. Means for maintaining a continuous record of the supply of stock at a distributing station which consists of a record for each class of stock supplied to the distributing station by the supply station, a designating ticket transferred with each article from the supply station to the distributing station, means on the said ticket for affixing the ticket to the article designated thereby, the said ticket being provided with a removable portion adapted to indicate by its detached condition that the article of stock which it was used to designate has passed out of stock, the said removable portion being adapted to be returned to the supply station to indicate to the supply station the amount of stock to be deducted from the record.

In testimony whereof I have hereunto subscribed my name in the presence of two subscribing witnesses.

JOHN M. DELSON.

Witnesses:
 CHARLES W. HILLS, Jr.,
 EARL M. HARDINE.